(12) United States Patent
Weihl

(10) Patent No.: US 12,268,123 B2
(45) Date of Patent: *Apr. 8, 2025

(54) VEHICLE WITH DEBRIS BLOWER AND LAWN MOWER

(71) Applicant: Ricky A. Weihl, Muskegon, MI (US)

(72) Inventor: Ricky A. Weihl, Muskegon, MI (US)

( * ) Notice: Subject to any disclaimer, the term of this patent is extended or adjusted under 35 U.S.C. 154(b) by 725 days.

This patent is subject to a terminal disclaimer.

(21) Appl. No.: 17/502,870

(22) Filed: Oct. 15, 2021

(65) Prior Publication Data

US 2022/0030765 A1 Feb. 3, 2022

Related U.S. Application Data

(63) Continuation of application No. 15/899,126, filed on Feb. 19, 2018, now Pat. No. 11,178,814.

(60) Provisional application No. 62/465,496, filed on Mar. 1, 2017.

(51) Int. Cl.
| | | |
|---|---|---|
| *A01D 34/71* | (2006.01) | |
| *A01D 34/66* | (2006.01) | |
| *A01D 43/077* | (2006.01) | |
| *A01D 69/00* | (2006.01) | |
| *A01G 20/47* | (2018.01) | |
| *A01D 101/00* | (2006.01) | |

(52) U.S. Cl.
CPC ............ *A01D 34/71* (2013.01); *A01D 34/66* (2013.01); *A01D 43/077* (2013.01); *A01D 69/002* (2013.01); *A01G 20/47* (2018.02); *A01D 2101/00* (2013.01); *Y02P 60/14* (2015.11)

(58) Field of Classification Search
CPC ....... A01D 34/00–34/905; A01G 20/40–20/47
See application file for complete search history.

(56) References Cited

U.S. PATENT DOCUMENTS

| | | |
|---|---|---|
| 1,992,820 A | 2/1935 | Gedney |
| 2,491,544 A | 12/1949 | Arkenberg |
| 2,531,081 A | 11/1950 | Melvin |
| 2,675,660 A | 4/1954 | Barnard |
| 2,762,184 A | 9/1956 | Farrer |
| 2,777,271 A | 1/1957 | Sutton |
| 2,882,668 A | 4/1959 | Murillo |
| 2,903,837 A | 9/1959 | Titzer |
| 3,058,284 A | 10/1962 | Anderson |
| 3,132,456 A | 5/1964 | Konrad |

(Continued)

FOREIGN PATENT DOCUMENTS

| | | |
|---|---|---|
| DE | 10 2007 015 668 | 10/2008 |
| EP | 0 031 158 | 7/1981 |

(Continued)

*Primary Examiner* — Thomas B Will
*Assistant Examiner* — Madeline I Runco
(74) *Attorney, Agent, or Firm* — Warner Norcross + Judd LLP

(57) ABSTRACT

A riding vehicle may include a blower assembly, a mower deck, and a power source. The blower assembly may be configured to direct air from an air inlet to at least one air outlet to move surface debris. The mower deck may be configured to cut a lawn formed of grass or other vegetation. The blower assembly may be configured to direct air to an interior space of the mower deck for assisted discharge of cuttings.

21 Claims, 7 Drawing Sheets

(56) References Cited

U.S. PATENT DOCUMENTS

| | | | |
|---|---|---|---|
| 3,512,898 A * | 5/1970 | Rinker | F04D 29/503 |
| | | | 415/152.2 |
| 3,708,968 A | 1/1973 | Enters et al. | |
| 3,778,986 A | 12/1973 | Wright et al. | |
| 3,984,893 A | 10/1976 | Ashley | |
| 4,114,353 A | 9/1978 | Ansbaugh et al. | |
| 4,190,032 A | 2/1980 | Wright | |
| 4,433,532 A | 2/1984 | McCunn | |
| 4,443,997 A | 4/1984 | Namdari | |
| 4,488,395 A | 12/1984 | Mack | |
| 4,773,205 A | 9/1988 | Hansen et al. | |
| 4,848,070 A | 7/1989 | Berglund | |
| 4,936,885 A | 6/1990 | Samejima et al. | |
| 4,945,716 A | 8/1990 | Murakawa et al. | |
| 5,004,251 A | 4/1991 | Velke et al. | |
| 5,020,309 A | 6/1991 | Hopkins | |
| 5,090,088 A | 2/1992 | Toth | |
| 5,107,566 A | 4/1992 | Schmid | |
| 5,138,825 A | 8/1992 | Trefz et al. | |
| 5,224,327 A | 7/1993 | Minoura et al. | |
| 5,507,138 A | 4/1996 | Wright et al. | |
| 5,542,243 A | 8/1996 | Yuki et al. | |
| 5,600,944 A | 2/1997 | Wright et al. | |
| 5,669,212 A | 9/1997 | Bening et al. | |
| 5,746,045 A * | 5/1998 | Haney | A01D 34/001 |
| | | | 56/13.3 |
| 5,765,347 A | 6/1998 | Wright et al. | |
| 5,809,755 A | 9/1998 | Velke et al. | |
| 5,964,082 A | 10/1999 | Wright et al. | |
| 5,984,031 A | 11/1999 | Velke et al. | |
| 6,059,055 A | 5/2000 | Velke et al. | |
| 6,073,305 A * | 6/2000 | Hesskamp | F04D 29/4246 |
| | | | 415/206 |
| 6,085,504 A | 7/2000 | Wright et al. | |
| 6,094,897 A | 8/2000 | Velke et al. | |
| 6,101,794 A * | 8/2000 | Christopherson | A01D 34/71 |
| | | | 280/124.179 |
| 6,105,350 A | 8/2000 | Vachon et al. | |
| 6,138,446 A | 10/2000 | Velke et al. | |
| 6,139,247 A | 10/2000 | Wright | |
| 6,182,429 B1 | 2/2001 | Velke et al. | |
| 6,189,304 B1 | 2/2001 | Velke et al. | |
| 6,189,305 B1 | 2/2001 | Wright et al. | |
| 6,205,753 B1 | 3/2001 | Velke et al. | |
| 6,276,486 B1 | 8/2001 | Velke et al. | |
| 6,301,865 B1 | 10/2001 | Velke et al. | |
| 6,327,839 B1 | 12/2001 | Velke et al. | |
| 6,390,225 B2 | 5/2002 | Velke et al. | |
| 6,405,515 B1 | 6/2002 | Wright et al. | |
| 6,415,587 B1 | 7/2002 | Velke et al. | |
| 6,438,930 B1 | 8/2002 | Velke et al. | |
| 6,438,931 B1 | 8/2002 | Velke et al. | |
| 6,442,917 B1 | 9/2002 | Velke et al. | |
| 6,490,849 B1 | 12/2002 | Scag et al. | |
| 6,499,282 B1 | 12/2002 | Velke et al. | |
| 6,516,596 B2 | 2/2003 | Velke et al. | |
| 6,550,563 B2 | 4/2003 | Velke et al. | |
| 6,560,952 B2 | 5/2003 | Velke et al. | |
| 6,625,965 B2 | 9/2003 | Wright et al. | |
| 6,640,526 B2 | 11/2003 | Velke et al. | |
| 6,658,831 B2 | 12/2003 | Velke et al. | |
| 6,675,566 B2 | 1/2004 | Martignon | |
| 6,688,089 B2 | 2/2004 | Velke et al. | |
| 6,688,090 B2 | 2/2004 | Velke et al. | |
| 6,779,325 B1 * | 8/2004 | Robillard, II | A01D 34/82 |
| | | | 56/12.7 |
| 6,862,872 B2 | 3/2005 | Wright et al. | |
| 6,868,658 B2 | 3/2005 | Velke et al. | |
| 6,912,831 B2 | 7/2005 | Velke et al. | |
| 6,935,092 B2 | 8/2005 | Velke et al. | |
| 6,935,093 B2 | 8/2005 | Velke et al. | |
| 7,047,713 B2 | 5/2006 | van Wouw | |
| 7,059,294 B2 | 6/2006 | Wright | |
| 7,318,311 B2 | 1/2008 | Wright et al. | |
| 7,325,388 B2 | 2/2008 | Wright et al. | |
| 7,354,169 B2 | 4/2008 | Velke et al. | |
| 7,428,884 B2 | 9/2008 | Velke et al. | |
| 7,523,795 B2 | 4/2009 | Velke et al. | |
| 7,596,934 B2 | 10/2009 | Waesche et al. | |
| 7,603,738 B1 * | 10/2009 | Woodcock | A01G 20/47 |
| | | | 15/340.1 |
| 7,607,283 B2 | 10/2009 | Wright et al. | |
| 7,624,996 B2 | 12/2009 | Velke et al. | |
| 7,712,294 B2 | 5/2010 | Wright et al. | |
| 7,753,160 B2 | 7/2010 | Velke et al. | |
| 7,841,044 B1 | 11/2010 | Weihl et al. | |
| 8,151,759 B2 | 4/2012 | Wright | |
| 8,302,927 B2 | 11/2012 | Wright | |
| 8,333,263 B1 | 12/2012 | Wright | |
| 8,387,205 B2 * | 3/2013 | Weihl | A01D 42/06 |
| | | | 15/347 |
| 8,579,058 B1 * | 11/2013 | Yamada | A01D 43/00 |
| | | | 180/53.8 |
| 8,869,936 B2 | 10/2014 | Wright | |
| 9,032,701 B2 * | 5/2015 | Walker | A01D 43/077 |
| | | | 56/202 |
| 9,066,468 B2 | 6/2015 | Zwieg et al. | |
| 9,642,303 B2 | 5/2017 | Walden | |
| 9,686,912 B2 | 6/2017 | Ito et al. | |
| 9,713,300 B2 | 7/2017 | Muffie | |
| 9,713,301 B2 | 7/2017 | Muffie | |
| 9,931,744 B2 | 4/2018 | Restall et al. | |
| 10,040,467 B2 | 8/2018 | Restall et al. | |
| 10,271,476 B2 | 4/2019 | Yoshimura et al. | |
| 10,327,392 B2 | 6/2019 | Conrad et al. | |
| 10,694,673 B2 | 6/2020 | Berglund et al. | |
| 2001/0001170 A1 | 5/2001 | Velke et al. | |
| 2001/0042653 A1 | 11/2001 | Velke et al. | |
| 2002/0014063 A1 | 2/2002 | Velke et al. | |
| 2002/0026779 A1 | 3/2002 | Velke et al. | |
| 2002/0059788 A1 | 5/2002 | Velke et al. | |
| 2002/0104706 A1 | 8/2002 | Velke et al. | |
| 2002/0162314 A1 | 11/2002 | Velke et al. | |
| 2002/0174637 A1 | 11/2002 | Velke et al. | |
| 2002/0178709 A1 | 12/2002 | Velke et al. | |
| 2003/0010007 A1 | 1/2003 | Wright et al. | |
| 2003/0084653 A1 | 5/2003 | Velke et al. | |
| 2003/0221402 A1 | 12/2003 | Velke et al. | |
| 2004/0055267 A1 | 3/2004 | Wright et al. | |
| 2004/0093840 A1 | 5/2004 | Velke et al. | |
| 2004/0103629 A1 | 6/2004 | Velke et al. | |
| 2005/0126146 A1 | 6/2005 | Velke et al. | |
| 2005/0241750 A1 | 11/2005 | McCormack et al. | |
| 2005/0263129 A1 | 12/2005 | Wright | |
| 2005/0279068 A1 * | 12/2005 | Bauer | A01D 34/71 |
| | | | 56/12.8 |
| 2006/0230734 A1 | 10/2006 | Wouw | |
| 2006/0231062 A1 | 10/2006 | Wright | |
| 2007/0039302 A1 | 2/2007 | Velke et al. | |
| 2007/0039304 A1 | 2/2007 | Wright et al. | |
| 2007/0044446 A1 | 3/2007 | Wright et al. | |
| 2007/0107403 A1 | 5/2007 | Velke et al. | |
| 2008/0034721 A1 | 2/2008 | Waesche et al. | |
| 2008/0034722 A1 | 2/2008 | Wright et al. | |
| 2008/0034723 A1 | 2/2008 | Wright et al. | |
| 2008/0050258 A1 | 2/2008 | Wright | |
| 2008/0072559 A1 | 3/2008 | Wright et al. | |
| 2008/0163596 A1 | 7/2008 | Velke et al. | |
| 2008/0314013 A1 | 12/2008 | Velke et al. | |
| 2010/0095926 A1 | 4/2010 | Wright | |
| 2010/0102926 A1 | 4/2010 | Grieve et al. | |
| 2010/0187398 A1 | 7/2010 | Wright | |
| 2011/0308216 A1 * | 12/2011 | Norton | A01D 42/08 |
| | | | 56/13.4 |
| 2012/0246865 A1 * | 10/2012 | Lauer | A01D 42/06 |
| | | | 15/405 |
| 2012/0255585 A1 * | 10/2012 | Kowalczyk | F26B 19/005 |
| | | | 34/523 |
| 2013/0025971 A1 | 1/2013 | Wright | |
| 2013/0074464 A1 | 3/2013 | Gindt et al. | |
| 2013/0276254 A1 * | 10/2013 | Norton | A01D 34/001 |
| | | | 15/246 |

(56) References Cited

U.S. PATENT DOCUMENTS

| | | | |
|---|---|---|---|
| 2015/0033693 A1 | 2/2015 | Ito et al. | |
| 2015/0096277 A1* | 4/2015 | Muffie | A01K 55/00 |
| | | | 119/712 |
| 2015/0190021 A1* | 7/2015 | Barkow | E01H 1/0809 |
| | | | 15/405 |
| 2016/0044867 A1 | 2/2016 | Martin | |
| 2016/0120131 A1* | 5/2016 | Conrad | F04D 25/0673 |
| | | | 15/319 |
| 2016/0150922 A1 | 6/2016 | Restall et al. | |
| 2016/0212937 A1* | 7/2016 | Walden | A01D 34/71 |
| 2018/0249629 A1 | 9/2018 | Weihl | |
| 2019/0327895 A1 | 10/2019 | Walden | |
| 2020/0077603 A1* | 3/2020 | Hoppel | A01D 42/06 |
| 2020/0100438 A1 | 4/2020 | Hile | |
| 2020/0296893 A1* | 9/2020 | Bohrer | A01G 20/47 |

FOREIGN PATENT DOCUMENTS

| | | |
|---|---|---|
| FR | 2 784 853 | 4/2000 |
| GB | 324 950 | 11/1998 |

\* cited by examiner

VEHICLE WITH DEBRIS BLOWER AND LAWN MOWER

TECHNICAL FIELD

The present application relates generally to a vehicle adapted to blow debris and mow a lawn, and more particularly to a vehicle having a drive system configured to drive at least one of cutting blades for mowing and a blower blade for generating a stream of air.

BACKGROUND

Yard maintenance often involves the use of several different machines, including a conventional lawn mower vehicle to cut grass. In many cases, a separate blower vehicle is utilized to clear areas of debris such as straw, leaves or dirt. At a commercial level, lawn care services will often transport both a conventional riding lawn mower vehicle and a conventional riding blower vehicle to a job site to conduct yard maintenance for a customer. Due to the size of these vehicles and the transport trailer often used to haul them, lawn care services regularly transport only two vehicles: one lawn mower vehicle and one blower vehicle. There is little redundancy in this arrangement. If one of the blower vehicle or the lawn mower vehicle fails to operate correctly at the job site or requires maintenance, work at the job site can be left incomplete until proper functioning equipment becomes available. For instance, if the lawn mower vehicle fails to operate correctly, workers may leave the job site unfinished to initiate maintenance on the failed mower vehicle. Workers may then return to the job site at a later time after a properly functioning mower vehicle becomes available for use. It should be apparent that delays associated with such failures can increase operating costs and cause inconvenience to the customer.

SUMMARY OF THE DESCRIPTION

The present disclosure is directed to a riding vehicle having a blower assembly and a mower deck. In one embodiment, the riding vehicle may include a mower deck and a plurality of cutting blades disposed within a cutting space of the mower deck. The mower deck may include a discharge chute for expelling cuttings from the mower deck. The blower assembly may include an air inlet opening and an air outlet opening, and may be configured to generate a stream of air from the air inlet to the air outlet.

In another embodiment, the air outlet of the blower assembly may be separate from the discharge chute of the mower deck. The stream of air provided by the air outlet may enable movement of debris on a surface from a first location to a second location. The riding vehicle may include a power source operatively coupled to the cutting blades and the blower assembly such that the same power source provides power to the cutting blades and the blower assembly.

In yet another embodiment, the cutting blades of the mower deck are operatively coupled to a power source via a clutch, and wherein the power source includes a power takeoff directly coupled to the blower assembly and the clutch. In this way, the power source may simultaneously drive both the cutting blades and the blower assembly, or drive only the blower assembly.

In still another embodiment, the blower assembly is configured to generate a stream of air from the air inlet to the air outlet, and the air outlet is operably coupled to a mower deck inlet to direct the stream of air to a cutting space of the mower deck. In this way, the blower assembly may assist discharge of cuttings from the mower deck. In a further embodiment, at least three cutting blades of the mower deck include a right cutting blade, a middle cutting blade, and a left cutting blade arranged in a reverse delta configuration.

In still a further embodiment, a method of operating a riding vehicle for maintenance of a lawn includes the step of providing a power source with a power takeoff to supply power to at least one of an impeller of a blower assembly, cutting blades of a mower deck, and at least two traction wheels. The method may include driving, with the power takeoff, the impeller of the blower assembly to direct air from an air inlet to an air outlet nozzle, and directing the air output from the air outlet nozzle to a surface area to move debris from one location to another location. The method may also include driving, with the power takeoff, the cutting blades of the mower deck to cut areas of the lawn, and discharging cuttings generated by the cutting blades through a discharge chute of the mower deck, wherein the discharge chute is separate from the air outlet nozzle.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

Figure 1:
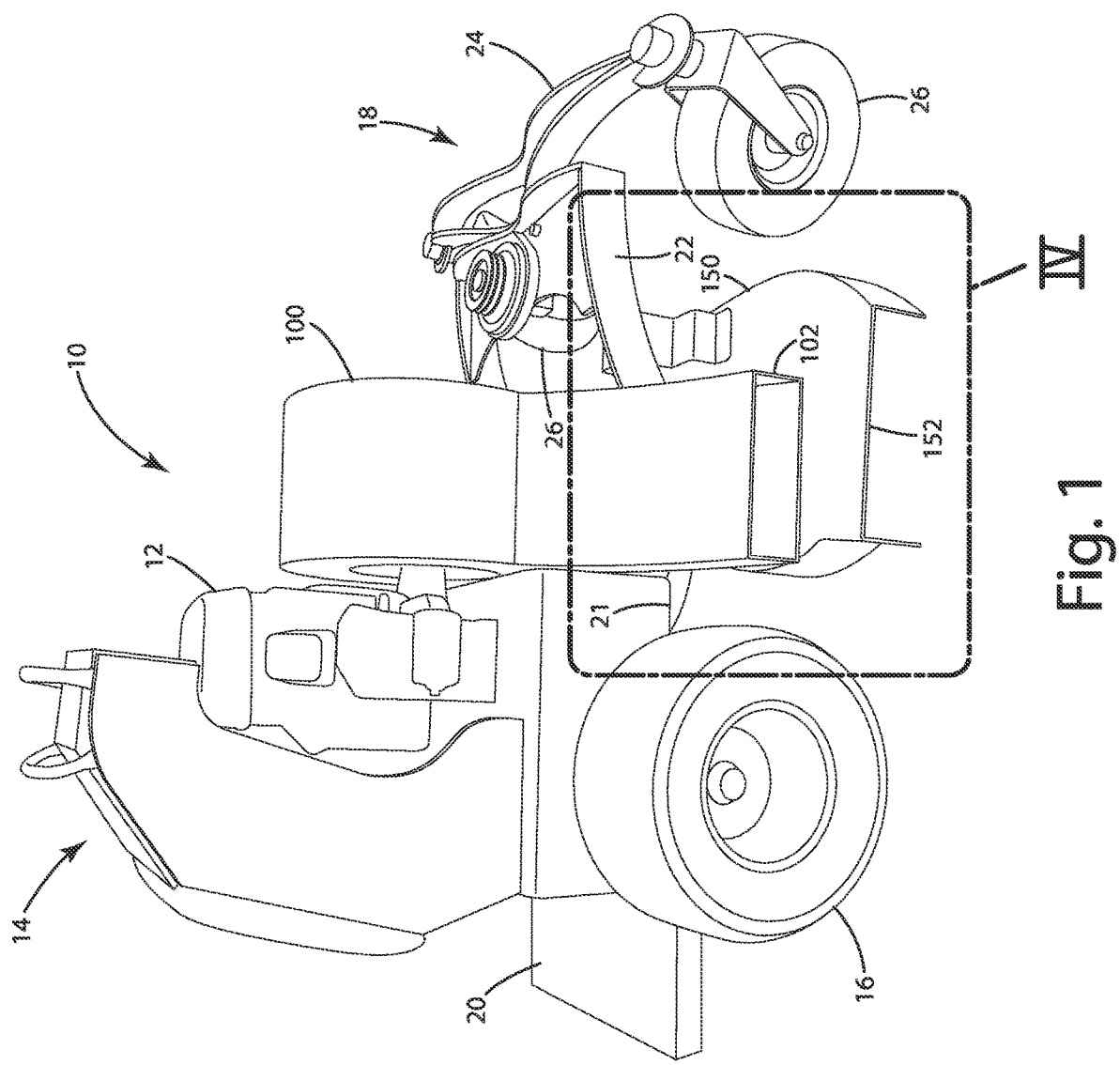
FIG. 1 is a perspective view of a riding vehicle according to one embodiment.
Figure 2:
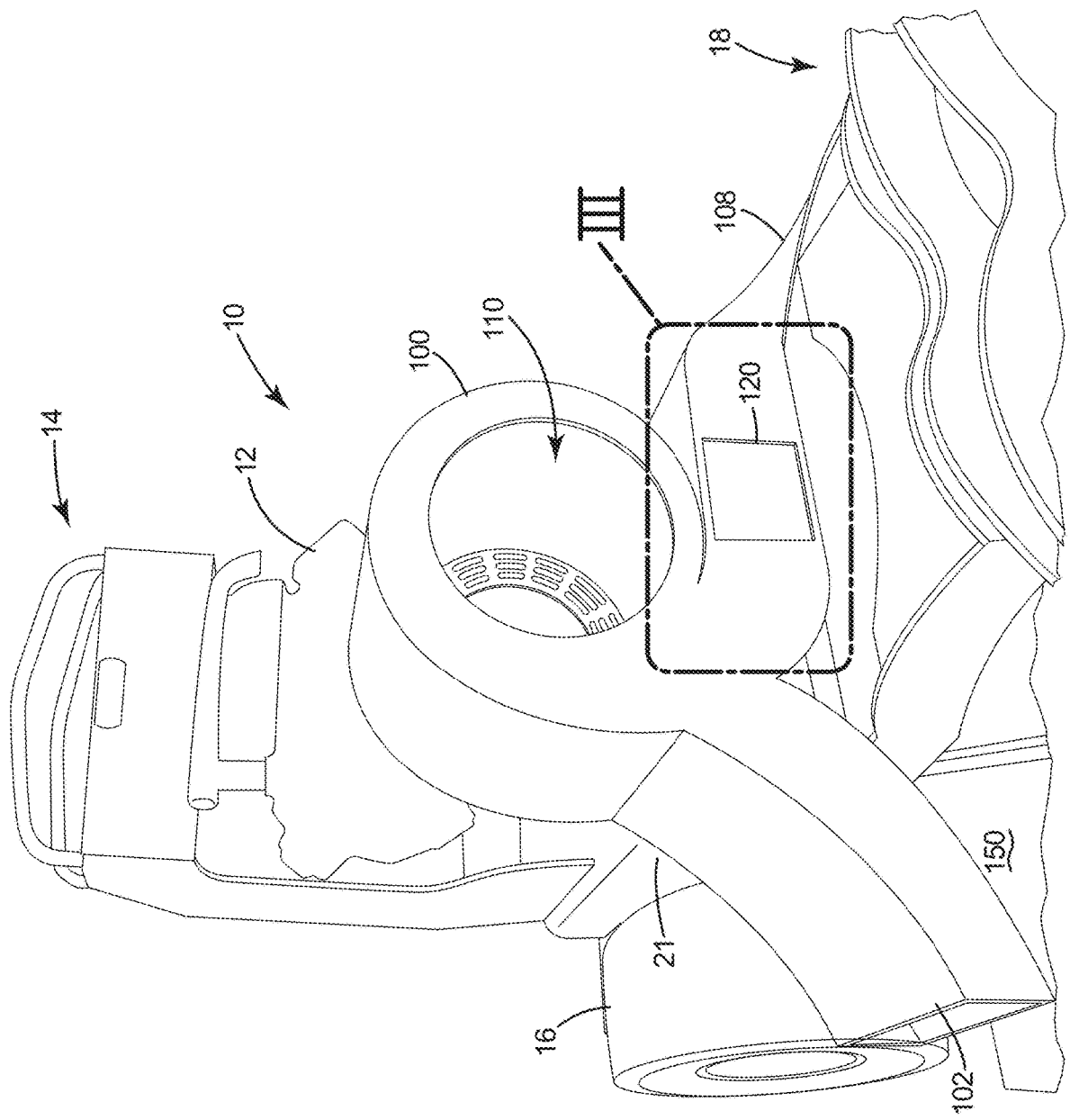
FIG. 2 is another perspective view of the riding vehicle.
Figure 3:
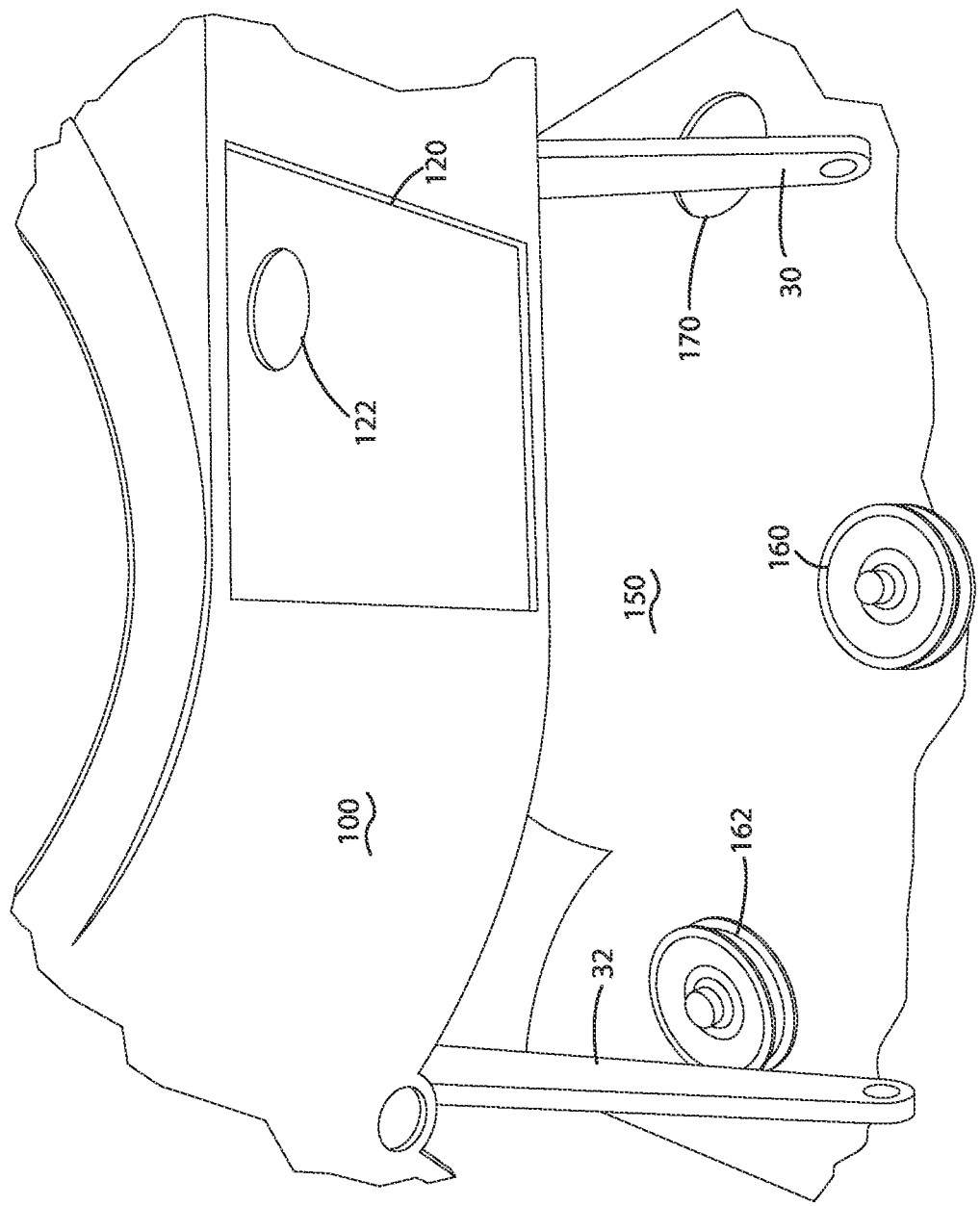
FIG. 3 is an expanded perspective view of the riding vehicle depicted in FIG. 2.
Figure 4:
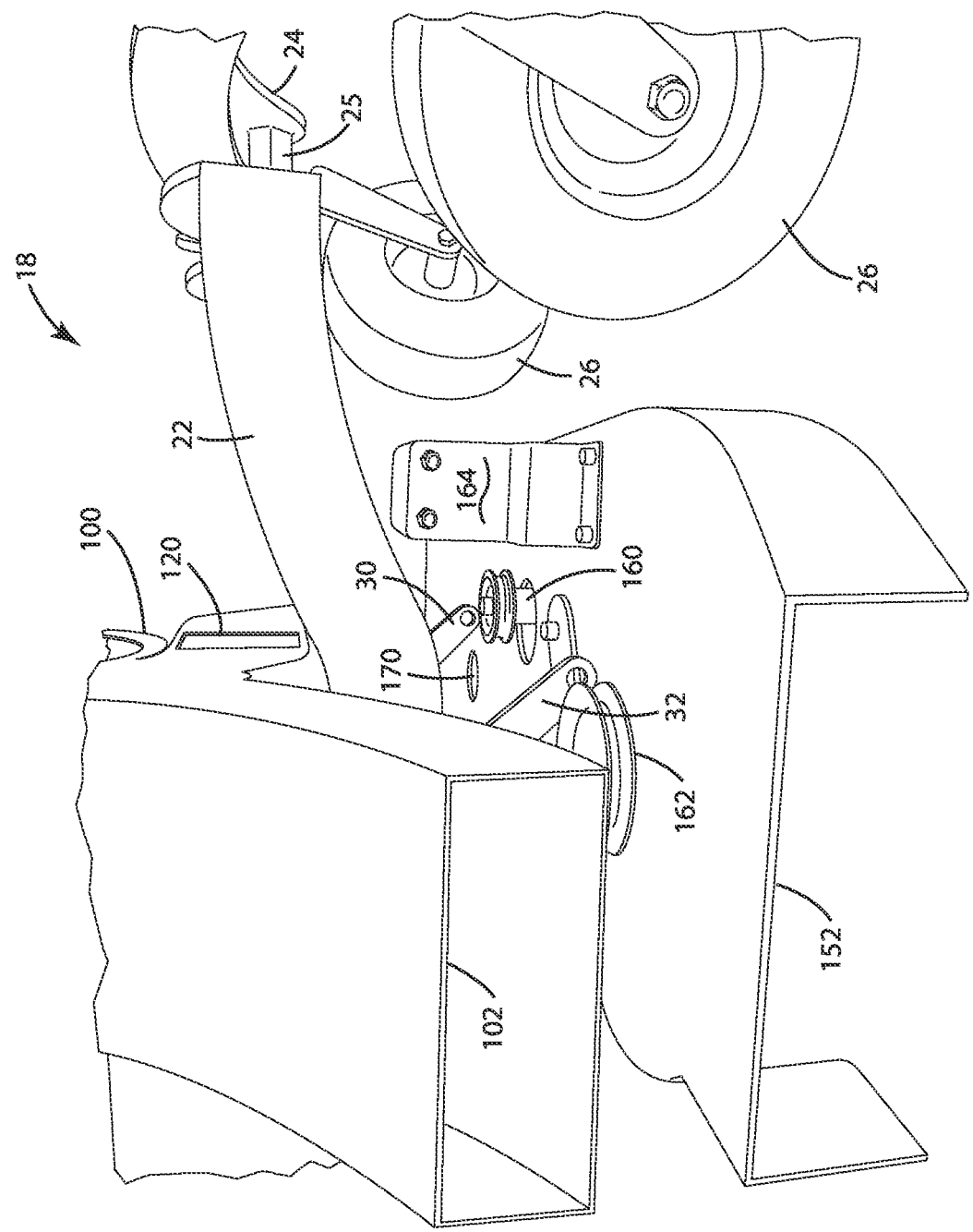
FIG. 4 is an expanded perspective view of the riding vehicle depicted in FIG. 1.

A riding vehicle according to one embodiment is shown and described in FIGS. 1-7, and generally designated 10. The riding vehicle may include a blower assembly 100, a mower deck 150, and a power source 12. The blower assembly 100 may be configured to direct air from an air inlet 110 to at least one air outlet. The mower deck 150 may be configured to cut a lawn formed of grass or other vegetation.

I. Overview of the Riding Vehicle

In addition to a blower assembly 100, a mower deck 150, and a power source 12, the riding vehicle 10 may include a frame 21 or primary chassis. The frame 21 may support one or more components of the riding vehicle 10, including, for example, the power source 12, the blower assembly 100 and the mower deck 150. The riding vehicle 10 may include at least two traction wheels 16 (e.g., a left wheel and a right wheel) further supported by the frame 21 and configured to drive the vehicle in a forward or reverse direction. In the illustrated embodiment, the riding vehicle 10 further includes at least two ground-contacting wheels 26 (e.g., one left wheel and one right wheel) that may stabilize the riding vehicle 10 or facilitate distributing the weight of the riding vehicle 10 over the ground in conjunction with the at least two traction wheels 16. For instance, the at least two traction wheels 16 and the at least two ground-contacting wheels 26 may be disposed respectively in one of four quadrants defined as rear-left, rear-right, forward-left, and forward-right quadrants with the center of mass of the riding vehicle 10 being the origin. In this arrangement, the at least two traction wheels 16 and the at least two ground-contacting wheels 26 may distribute the load or weight of the riding vehicle 10 over the ground, thereby stabilizing the riding vehicle 10. The at least two ground-contacting wheels 26 in one embodiment may be castor-type wheels that enable zero turning radius (ZTR) capability.

The at least two traction wheels 16 may be operably coupled to the power source 12 via a hydrostatic transmission (not shown), which in conjunction with the power source 12 define a drive system for the riding vehicle 10. The hydrostatic transmission may include two separate hydrostatic transaxles capable of independently driving the at least two traction wheels 16 in forward or reverse directions, and at varying speeds. It should be understood that any type of drive system may be utilized, including, for example, a single dual axle hydrostatic transaxle.

The frame 21 of the riding vehicle 10 may include a front suspension 18 configured to support the at least two ground-contacting wheels 26 near the front of the riding vehicle 10. The front suspension 18 may comprise a front frame element 22 fixedly coupled to the main body of the frame 21, and include forward control arms 24 that are movably coupled to the front frame element 22. Each end of the forward control arms 24 may support one of the at least two ground-contacting wheels 26. In the illustrated embodiment of FIG. 7, mounting between the forward control arms 24 and the front frame element 22 is facilitated by a joint 25 that enables the forward control arms 24 to rotate relative to the front frame element 22. The joint 25 may be disposed between left and right sides of the riding vehicle 10 such that the length of the forward control arms 24 is divided substantially evenly at the joint 25 between respective ground-contacting wheels 26. In this way, as the riding vehicle 10 approaches an uneven surface, the forward control arms 24 may tilt or rotate relative to the frame 21 to facilitate maintaining contact between the ground and at least two ground-contacting wheels 26.

The riding vehicle 10 may include a platform 20 (e.g., a riding platform) coupled to the frame 21, and arranged to enable an operator to stand while operating the riding vehicle 10. In the illustrated embodiment, the platform 20 is disposed near the rear of the riding vehicle 10. The platform 20 may be forward or aft of a rotational axis of rear-located traction wheels. It should be understood that the present disclosure is not limited to a platform 20 arranged to provide stand-up riding capabilities. For instance, the riding vehicle 10 may be a sit-down type vehicle such that the platform 20 is a seat for supporting the operator while operating the riding vehicle 10. The seat in such an embodiment may be disposed forward or aft of the power source 12 and/or the blower assembly 100.

In the illustrated embodiment, the riding vehicle 10 includes an operator control system 14 that provides one or more operator controls for the operator to direct operation of the riding vehicle 10. As an example, the operator control system 14 may include left and right levers that independently direct forward/reverse operation of respective left and right traction wheels 16. With such independent control over left and right traction wheels 16, the operator can drive the riding vehicle 10 forward, reverse, left and right. The operator control system 14 may further include an ignition switch that controls ignition of the riding vehicle 10 and enablement of an electrical system. The operator control system 14 may be configured to enable/disable operation of the at least two traction wheels 16 based on presence of the operator, and may engage/disengage a brake based on presence of the operator. An example of such a system is described in U.S. patent application Ser. No. 14/633,644, entitled VEHICLE CONTROL SYSTEM, and filed Feb. 27, 2015.

II. The Blower Assembly

The blower assembly 100 may include an impeller 112 configured to pump air (e.g., the ambient air surrounding the riding vehicle 10) from the air inlet 110 to the at least one air outlet. To avoid pulling in potentially destructive debris through the air inlet 110, the blower assembly 100 may include a shield 101 that enables inflow of air through the air inlet 110 but includes spaced apart material to limit entry of objects larger than the space between the material. The impeller may include any type of rotatable component capable of moving air, e.g., a squirrel-cage-type impeller or a fan-type blower.

In the illustrated embodiment, the at least one air outlet includes at least one nozzle configured to direct air toward a surface area to move debris from one location to another location. Additionally, or alternatively, the at least one air outlet may include an opening in gaseous communication with the mower deck 150 so that air pulled from the air inlet 110 may be directed to an internal space of the mower deck 150. The illustrated embodiment of FIGS. 1-7 depicts the at least one air outlet including three nozzles for moving surface debris corresponding to a right nozzle 102, a forward facing nozzle 106, and a left nozzle 108. As depicted in the illustrated embodiments of FIGS. 3, 4, 6 and 7, the blower assembly 100 may include an opening 120 coupled to a conduit 104, which provides the forward facing nozzle 106. The illustrated embodiment also depicts the at least one air outlet including a mower deck air supply outlet 122 configured to supply air to the mower deck 150. It should be understood that the present disclosure is not limited to this specific configuration, and that the at least one air outlet may include a subset of these features, including, for example, a single air outlet corresponding to a nozzle for moving surface debris or only the mower deck air supply outlet 122.

The blower assembly 100 in the illustrated embodiment may include at least one deflector plate or damper operably coupled to the operator control system 14. In the illustrated embodiment, each of the three nozzles 102, 106, 108 and the mower deck air supply outlet 122 is associated with a deflector plate that can selectively enable/disable air flow through the respective nozzle or air outlet. The deflector plate may be coupled to an actuator capable of moving the deflector plate to substantially block air flow through a respectively associated nozzle or air outlet. The actuator may include an electrically driven motor and an actuation member movable by the motor to transition the deflector plate between a blocking position and an open position. The operator control system 14 may be configured to control supply of power to the electrically driven motor to control whether the deflector plate is in the blocking position or the open position. In this way, the operator control system 14 may enable an operator to control air output from the three nozzles 102, 106, 108 and the mower deck air supply outlet 122. It should be understood that the not all air outlets of the blower assembly 100 may be associated with a controllable deflector plate. For instance, the mower deck air supply outlet 122 may not be associated with a controller deflector plate.

III. The Mower Deck

The mower deck 150 may include a plurality of cutting blades 180, 182, 184 configured to cut a lawn, which, as mentioned herein, may include grass or other vegetation. In the illustrated embodiment of FIG. 5, the cutting blades include a right cutting blade 180, a center cutting blade 182, and a left cutting blade 184, relative to a cutting direction of the mower deck 150. For instance, the mower deck 150 may be coupled to a frame 21 of the riding vehicle 10 such that a forward direction of the riding vehicle 10 corresponds to the cutting direction of the mower deck 150. The height of the mower deck relative to the ground may be controlled by control arms 30, 32 coupled to the mower deck 150 and under control of actuators (not shown) that can be operated by the operator control system 14.

It is noted that the cutting action of each cutting blade includes at least two types of cuts: a coarse cut and a finish cut. The forward cutting space of each cutting blade 180, 182, 184, or the position of the cutting blade that makes the first cut as the mower deck 150 travels in the cutting direction, may perform the coarse cut. This first cut or coarse cut may occur after grass blades of the lawn have just cleared a front edge 151 of the mower deck 150, which may push down the grass blades as they travel under the front edge 151. Because the grass blades may not be completely upright at this stage, the cutting blade may cut the grass blades above a desired cut height. As the mower deck 150 continues to travel in the cutting direction, the grass blades enter the rear cutting space of each cutting blade 180, 182, 184. In this rear cutting space, the cutting blade may perform the finish cut. The rear cutting space may be proximate the position of the blade as it travels near the rear edge 153 of the mower deck 150 (or a possible baffle). It should be understood that not all blades of grass that encounter the mower deck 150 enter the forward cutting space and the rear cutting space for the same duration. For example, for a given vehicle speed, blades of grass positioned left or right of a rotational axis of the cutting blades (relative to the cutting direction) may enter the forward and rear cutting spaces for a length of time that is shorter than that associated with blades of grass positioned closer to the rotational axis. In an attempt to offset the effects of this difference in time, the front edge 151 of the mower deck 150 may be spaced from the cutting blades to enable blades of grass positioned farther away from the rotational axis additional time to return to an upright position. This additional time may enable the length of the coarse cut to be closer to or in fact the same as a finish cut.

The rear cutting space of the plurality of cutting blades 180, 182, 184 and the rear edge 153 of the mower deck 150 may be arranged to be in closer proximity to each other than the proximity between the front edge 151 and the forward cutting space. In the illustrated embodiment, the rear edge 153 of the mower deck 150 (or baffle) is spaced substantially evenly from the rear cutting space of the respective cutting blades 180, 182, 184. This spacing may be between ⅛ inch and 2 inches, or between ⅛ inch and ½ inch, or approximately 5/16 inch. In maintaining proximity between the rear edge 153 and the rear cutting space, a vacuum may be generated in the rear cutting space that facilitates positioning blades of grass in an upright position for the finish cut.

Figure 5:
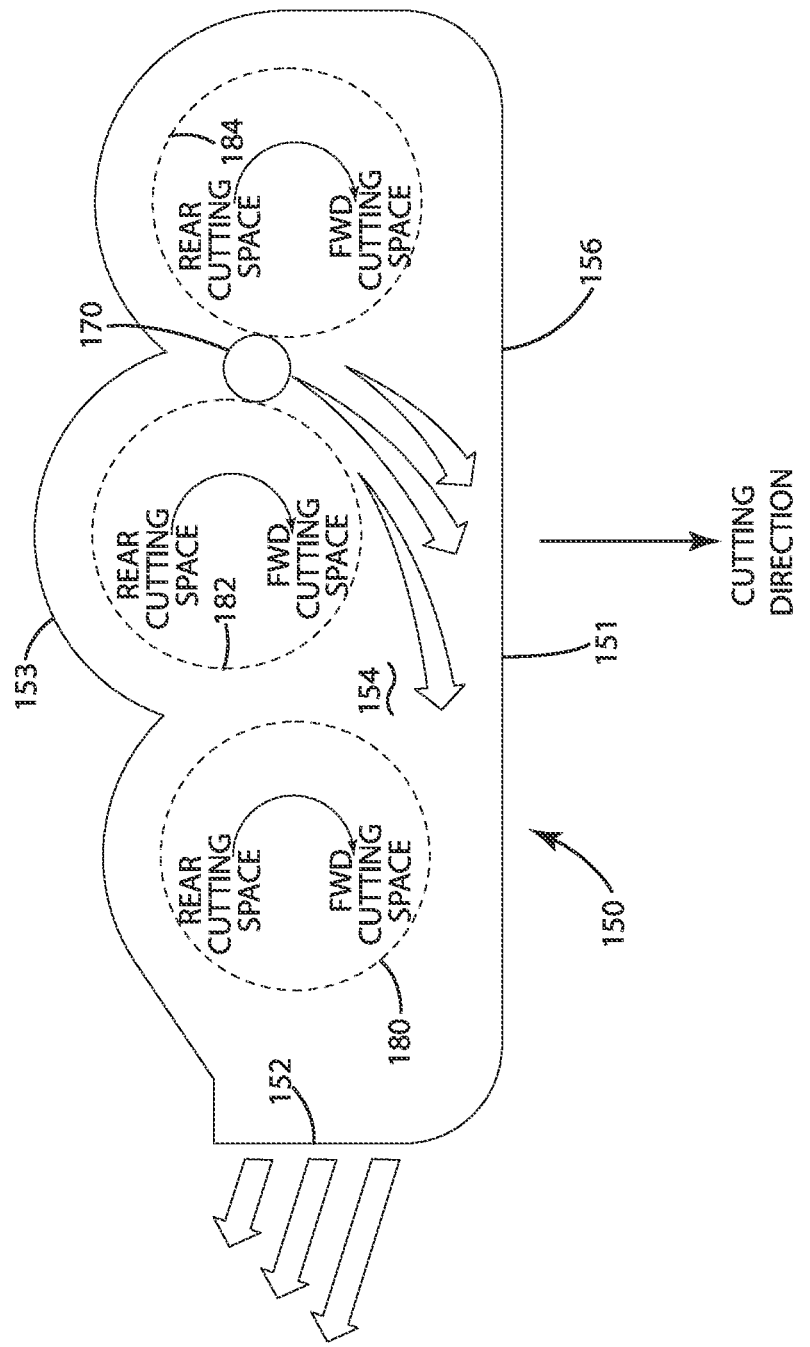
FIG. 5 is a representative view of a mower deck for the riding vehicle according to one embodiment.
Figure 6:
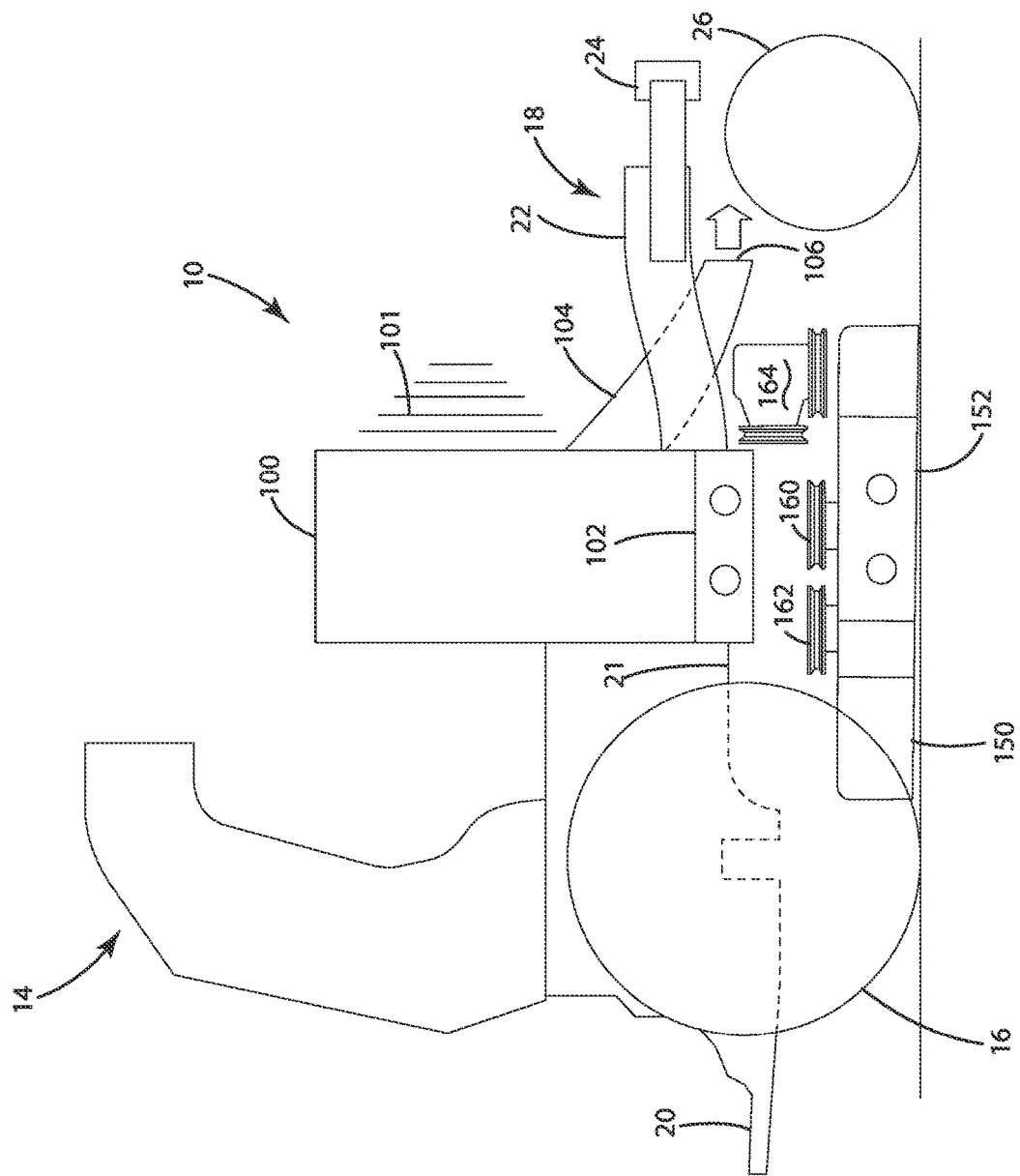
FIG. 6 is a side view of the riding vehicle.

In the illustrated embodiment of FIG. 5, the plurality of cutting blades 180, 182, 184 are arranged in a reverse delta configuration in which a right blade 180 and a left blade 184 are disposed forward of a middle blade 182 in a 'V' arrangement with respect to the cutting direction of the mower deck 150. In this configuration, the rear cutting spaces of the middle blade 182, the right blade 180, and the left blade 184 can be disposed approximately the same distance from the rear edge 153 of the mower deck 150. As discussed herein, close proximity with respect to the rear cutting space and the rear edge 153 may facilitate generation of a vacuum in the rear cutting space for the finish cut. Although the plurality of cutting blades 180, 182, 184 are disposed in a reverse delta configuration in the illustrated embodiment, it should be understood that the present disclosure is not so limited. For instance, the plurality of cutting blades 180, 182, 184 may be arranged in a delta configuration (e.g., in a '^' arrangement) in which the middle blade is forward of the right blade 180 and the left blade 184 with respect to the cutting direction of the mower deck 150. It is noted that in the delta configuration, the distance between the rear cutting space of the middle cutting blade 182 and the rear edge 153 may be greater than the distance between the rear cutting spaces of the left and right cutting blades 180, 184 and the rear edge 153. This difference in spacing may yield less vacuum in rear cutting space of the middle blade 182 in the delta configuration, and for this reason, the cutting action of the reverse delta configuration may in some cases be cleaner than the delta configuration. For this reason, in some cases, one or more baffles may be incorporated into the cutting space. In other words, the reverse delta arrangement may produce a better finish cut than the delta arrangement.

Another example arrangement of the plurality of cutting blades 180, 182, 184 includes a straight configuration (e.g., in a '−' arrangement) where rotational axes of the plurality of cutting blades are 180, 182, 184 substantially even with each other relative to the cutting direction. It should further be understood that a mower deck 150 according to one embodiment of the present disclosure may include a single cutting blade.

The mower deck 150 may also include a discharge chute 152 through which cuttings generated by the cutting blades 180, 182, 184 can be expelled from the mower deck 150. In one embodiment, the at least one air outlet 102, 106, 108 is separate from the discharge chute 152 such that air output from the at least one air outlet 102, 106, 108 is separate from the cuttings expelled through the discharge chute 152. The mower deck 150 includes an internal space 154 defined by a deck housing 156 within which the cutting blades 180, 182, 184 spin when driven. The deck housing 156 is open along a surface of the lawn, and may further define the discharge chute 152 through which cuttings may be expelled from the internal space 154. In one embodiment, the discharge chute 152 may include a chute blocker (not shown)

that may be selectively engaged/disengaged by an operator (via an operator control system 14 of the riding vehicle 10) to respectively enable or substantially prevent cuttings from being expelled through the discharge chute 152. As an example, if an operator determines he is closing in on area on which he does not desire to throw cuttings, the operator may engage the chute blocker to prevent expulsion of the cuttings in that area. After the operator has maneuvered the riding vehicle 10 past the area of concern, the operator may disengage the chute blocker to enable expulsion of the cuttings from the internal space 154 of the mower deck 150.

In the illustrated embodiment, the mower deck 150 includes a mower deck air inlet 170 in gaseous communication with the mower deck air supply outlet 122 of the blower assembly 100. The mower deck air inlet 170 may enable the blower assembly 100 to direct air through the internal space 154 of the mower deck 150, potentially aiding in expulsion of cuttings therefrom. For instance, by directing air into the internal space 154 of the mower deck 150, the blower assembly 100 may increase air flow through the internal space 154 to the discharge chute 152, thereby enhancing the discharge rate of cuttings from the mower deck 150. Enhanced discharge of cuttings from the mower deck 150 may prevent excess cuttings from impeding the cutting action of the cutting blades 180, 182, 184. This may enable the mower deck to provide a cleaner or more uniform cut to the lawn over conventional mower decks. Although the mower deck 150 is depicted with a single mower deck air inlet 170 located proximal between the cutting spaces of the middle and left cutting blades 182, 184, it should be understood that the mower deck 150 may include a plurality of mower deck air inlets, and that the one or more mower deck air inlets 170 may be disposed at any position of the mower deck 150.

As discussed herein, the reverse delta arrangement of the plurality of cutting blades 180, 182, 184 may facilitate generation of a greater vacuum in the rear cutting space of the middle cutting blade 182 relative to a delta arrangement. In the illustrated embodiment of FIG. 5, it is noted that the forward cutting spaces of the plurality of cutting blades 180, 182, 184 provide the primary force in expelling cuttings through the discharge chute 152. As can be seen in the illustrated embodiment of FIG. 5, the discharge chute 152 is positioned in the discharge path of cuttings generated by the plurality of cutting blades 180, 182, 184 spinning in a clockwise direction.

It has been shown that, in some cases, the reverse delta configuration of the plurality of cutting blades 180, 182, 184 can suffer in discharging cuttings generated from the middle cutting blade 182. Because the rotational axis of the middle cutting blade 182 is rear of the rotational axis of the left cutting blade 184, portions of the two cutting blades, in motion, in an area in proximal to each other are moving in different directions. For example, in the illustrated embodiment of FIG. 5, portions of these two cutting blades 182, 184 proximal to the mower deck air inlet 170 are moving in opposite directions. As a result, the discharge action of the middle cutting blade 182 in this area can be counteracted by motion of the left cutting blade 184. The reverse delta configuration according to one embodiment can yield a cleaner cut of the grass due to the position of the middle cutting blade 182, but can be susceptible to accumulation of cuttings near the middle cutting blade 182. It should be understood that not all reverse delta configurations may experience accumulation of cuttings in this manner.

IV. Power Source coupling to the Blower Assembly or the Mower Deck, or both

The power source 12 of the riding vehicle 10 may be configured to transfer power to a power take-off 168 (PTO) that may be operably coupled to one or more components of the riding vehicle 10, including, for example, at least one of the impeller 112 of the blower assembly 100 and the cutting blades 180, 182, 184 of the mower deck 150. In the illustrated embodiment, the PTO 168 may drive the impeller 112 and the cutting blades 180, 182, 184 in a simultaneous manner. The PTO 168 may be selectively coupled to the impeller 112 or the cutting blades 180, 182, 184, or a combination thereof.

Figure 7:
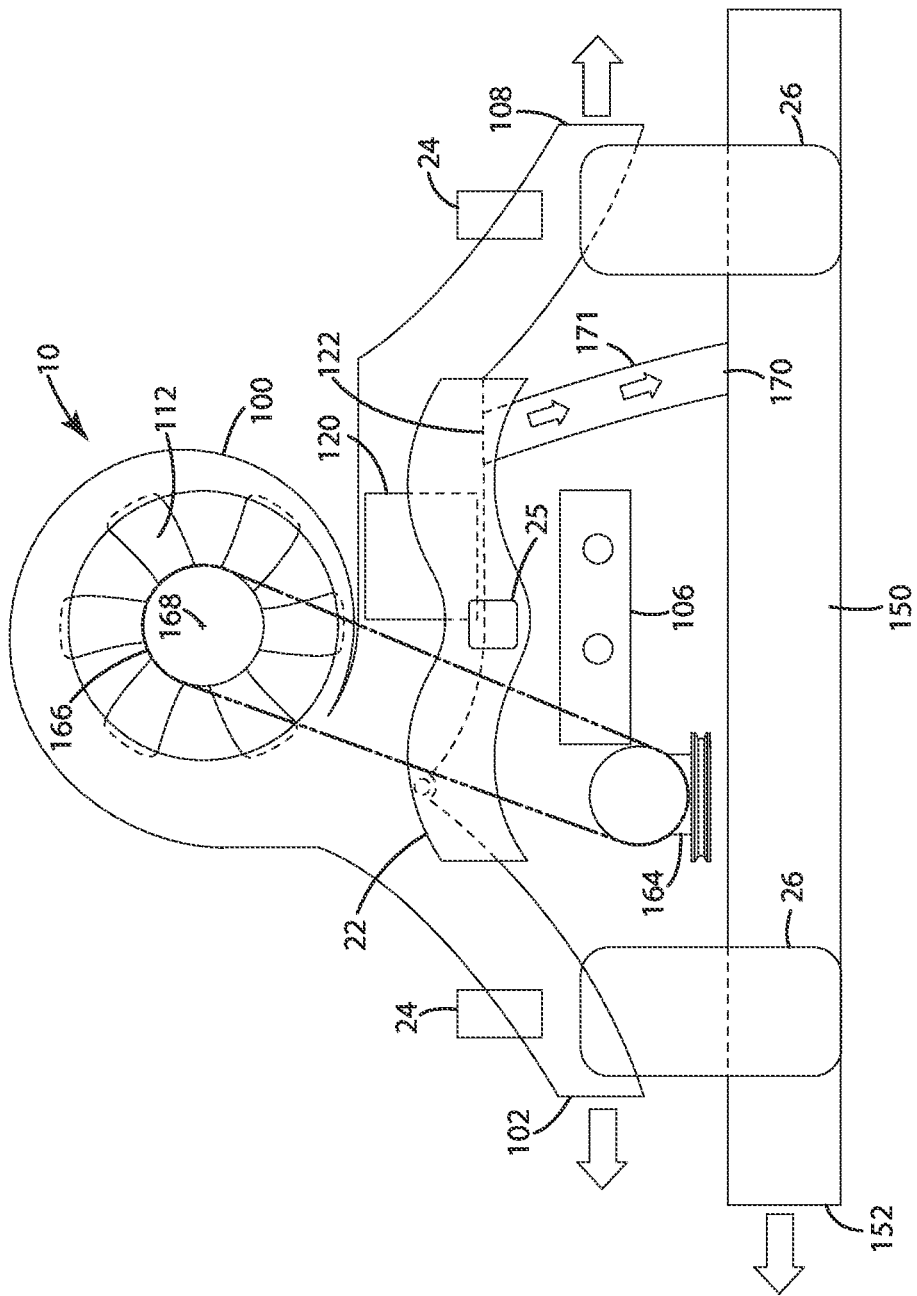
FIG. 7 is a front view of the riding vehicle.

As an example, in the illustrated embodiment of FIG. 7, a clutch 166 is disposed on an end of the PTO 168 distal from the power source 12, and the impeller 112 may be coupled to the PTO 168 between the power source 12 and the clutch 166 via a spline coupling. The clutch 166 may be coupled to a drive belt that drives a gearbox 164 that in turn drives a belt coupled to pulleys (e.g., pulleys 162, 160 in FIG. 6) attached to a drive shaft of each cutting blade 180, 182, 184. The gearbox 164 in the illustrated embodiment is mounted to the mower deck 150. In this configuration, with the clutch 166 engaged, the gearbox 164 provides power to the plurality of cutting blades 180, 182, 184 so that the plurality of cutting blades 180, 182, 184 spin clockwise. The clutch 166 in the illustrated embodiment may be an electronic clutch capable of being selectively engaged/disengaged to drive the gearbox 164 and in turn the plurality of cutting blades 180, 182, 184. In this way, the PTO 168 may simultaneously drive both the impeller 112 and the plurality of cutting blades 180, 182, 184. It should be understood that simultaneous and/or selective supply of power to the impeller 112 and the plurality of cutting blades 180, 182, 184, or a combination thereof, may be achieved in a different way and that the present disclosure is not limited to the construction of the illustrated embodiment. For instance, the gearbox 164 may include a clutch component, and the clutch 166 may be replaced with pulleys. Selective engagement of the clutch component of the gearbox may enable supply of power to the cutting blades 180, 182, 184.

Because the height of the mower deck 150 may be raised and lowered relative to the ground by the operator (to facilitate operator selection of cut height for the lawn), the distance between the clutch 166 and the gearbox 164 may be variable. A take-up pulley (not shown) may be arranged to take up any slack in the belt that couples the clutch 166 to the gearbox 164.

In the illustrated embodiment of FIG. 7, the PTO 168 is arranged horizontally. However, the present disclosure is not limited to this arrangement—the PTO 168 may be configured differently, such as being vertical or tilted between horizontal and vertical.

The power source 12 may be any type of power source configured to rotate the PTO 168. For instance, the power source 12 may be a combustion engine, such as a 20 horsepower combustion engine that uses gasoline or natural gas as a fuel. Alternatively, the power source 12 may be an electric motor.

V. Assisted Discharge of Cuttings from the Mower Deck

In the illustrated embodiment of FIGS. 1-7, and as described herein, the riding vehicle 10 may be configured to supply air to the mower deck 150 to assist discharge of cuttings from the plurality of cutting blades 180, 182, 184. In one embodiment, the mower deck air supply outlet 122 of the blower assembly 100 may be in gaseous communication with the mower deck air inlet 170 of the mower deck 150.

Although described in connection with a single gaseous coupling between the blower assembly 100 and the mower deck 150, it should be understood that there may be one or more air outputs of the blower assembly 100 that are coupled to one or more air inputs of the mower deck 150, including couplings between one output and many inputs, and couplings between many outputs and one input.

In the illustrated embodiment, a conduit 171 provides the coupling between the mower deck air supply outlet 122 and the mower deck air inlet 170. The conduit 171 may be semi-rigid hose configured to join with respective collars disposed on the mower deck air supply outlet 122 and the mower deck air inlet 170. Sizing of the conduit 171, the mower deck air supply outlet 122 and the mower deck air inlet 170 may vary from application to application, depending on a flow rate determined to facilitate enhanced discharge of cuttings from the mower deck 150. In one embodiment, the diameter of the conduit 171 may be between 2 and 5 inches, or between 2 and 3 inches.

In the illustrated embodiment, the degree of air flow sufficient to move surface debris in a meaningful way may be less than the degree of air flow sufficient to facilitate enhanced discharge of cuttings from the mower deck 150. As a result, the determined flow rate of air via the conduit 171 to the mower deck 150 may be less than the flow rate of air through at least one of the nozzles 102, 106, 108 of the blower assembly 100 with an associated deflector plate in the open position. For instance, the size of the nozzle opening may be larger than the size of the conduit 171. More specifically, in one embodiment, a cross sectional area of the nozzle opening may be between 7 to 20 times the cross sectional area of the conduit. In this way, the air flow through the nozzle may be substantially larger than the air flow through the conduit 171.

It is further noted that, with the deflector plate for each respective nozzle 102, 106, 108 in the closed position such that the blower assembly 100 is configured to supply air substantially only to the mower deck 150, the load on the impeller 112 is less than when at least one of the deflector plates is in the open position. This may be due at least in part to the decreased flow rate through the conduit 171 as compared to when one or more of the nozzles 102, 106, 108 are fully operational or the associated deflector plates are in the open positon. In other words, when the blower assembly 100 is operating only in a discharge assist mode (with air flowing to the mower deck 150), the load on the impeller 112 may be less than when the blower assembly 100 is operating in a debris blower mode (with one or more of the nozzle deflectors open), alone or in conjunction with the discharge assist mode.

The decreased load on the impeller 112 when operating only in the discharge assist mode may result in a reduction in loading on the power source 12. This reduction in loading may be offset by an increase in loading caused by engagement of the clutch 166 to drive the plurality of cutting blades 180, 182, 184. In this way, the maximum load on the power source 12 may occur during operation of the blower assembly 100 in both the discharge assist mode and the debris blower mode, and with the clutch 166 engaged.

In one embodiment, the operator control system 14 may be configured to allow engagement of the clutch 166 to drive the plurality of cutting blades 180, 182, 184 if the blower assembly 100 is configured only in the discharge assist mode (such that the nozzle deflectors are closed). This way, the maximum loading on the power source 12 may be less than if the clutch 166 were engaged and the blower assembly 100 were operating in both the debris blower mode and the discharge assist mode. In one embodiment, the operator control system 14 may include a clutch lockout circuit and/or mechanism that prevents engagement of the clutch 166 if the blower assembly 100 is operating to supply air out of one or more of the nozzles 102, 106, 108. By limiting operation of cutting blades 180, 182, 184 while operating the blower assembly 100 only in the discharge assist mode, the power rating of the power source 12 fitted on the riding vehicle 10 may be reduced relative to operation without this limitation (e.g., a 25%-50% reduction, or from a 25 horsepower motor to a 15 horsepower motor). The reduction in motor size can yield substantial savings in cost, weight, and fuel economy.

In the illustrated embodiment of FIG. 5, as discussed herein, the reverse delta configuration of the plurality of cutting blades 180, 182, 184 may experience accumulation of cuttings in the area proximal to the mower deck air inlet 170. With the blower assembly 100 operating in the discharge assist mode, air may be directed to this area via the mower deck air inlet 170. This supply of air from the blower assembly to areas of the mower deck 150 in which cuttings potentially accumulate may substantially avoid such accumulation. In the context of the reverse delta configuration, prevention of accumulation of cuttings by supply of air from the blower assembly 100 may enable the reverse delta configuration to provide a cleaner cut than the delta configuration without the drawbacks of potential accumulation of cuttings. As can be seen in the illustrated embodiment of FIG. 5, air flow from the mower deck air inlet 170 may be directed across the forward cutting space of the middle cutting blade 182 to facilitate enhanced discharge of cuttings from this space. It should be understood that air from the blower assembly 100 may be directed to different and/or additional areas of the internal space 154 of the mower deck 150 to facilitate assisted discharge of cuttings. For instance, the mower deck air inlet 170 may be positioned in the deck housing 156 at the left side (relative to the cutting direction) and proximal to the forward cutting space of the left blade 184. In this way, air may be directed across the forward cutting space of the cutting blades 180, 182, 184. It should further be noted that the mower deck air inlet 170 may be coupled to air channels within the internal space 154 of the mower deck 150 to direct air in one or more particular directions within the internal space. Such air channels may form an air manifold or an air knife that may increase or decrease velocity of the air through the channel.

In one embodiment, the internal space 154 may include one or more flow control baffles to control and direct air flow within the internal space 154. In one embodiment, the one or more baffles may be disposed in close proximity to the cutting blades 180, 182, 184 to facilitate generation of a vacuum in the rear cutting space, and to facilitate directing cuttings through the internal space 154. As an example, one or more baffles may define internal chambers associated with each of the cutting blades 180, 182, 184 with one or more ports that enables discharge of cuttings from one chamber to the next, ultimately to the discharge chute 152.

In an alternative embodiment, the riding vehicle 10 may include components in addition to or alternative to the plurality of cutting blades 180, 182, 184 that are powered by the power source 12. For instance, the riding vehicle 10 may include an edger powered simultaneously with the blower assembly 100 by the power source 12 simultaneously. The blower assembly 100 may move debris generated by the edger, and without use of multiple power sources.

Directional terms, such as "vertical," "horizontal," "top," "bottom," "upper," "lower," "inner," "inwardly," "outer"

and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z ; and Y, Z.

The embodiments of the invention in which an exclusive property or privilege is claimed are defined as follows:

1. A riding vehicle comprising:
   a frame coupled to a riding platform adapted to support a user;
   a plurality of wheels coupled to the frame comprising at least two opposing traction wheels;
   a mower deck and a plurality of cutting blades disposed within a cutting space of the mower deck, the mower deck including a discharge chute for expelling cuttings from the mower deck;
   a blower assembly supported by the frame and including an air inlet and an air outlet, the blower assembly configured to generate a stream of air from the air inlet to the air outlet, the air outlet being separate from the mower deck, the stream of air enabling movement of debris on a surface from a first location to a second location; and
   a power source coupled to the frame, the power source operatively coupled with the at least two opposing traction wheels, the cutting blades, and the blower assembly such that the same power source provides power to the at least two opposing traction wheels, the cutting blades, and the blower assembly, whereby the same power source is configured to power the cutting blades to cut vegetation and power the blower assembly to direct the stream of air separate from the mower deck via the air inlet and the air outlet of the blower assembly; and
   wherein the cutting blades are operatively coupled to the power source via a clutch, wherein the clutch is configured to selectively disengage the power source from driving the cutting blades while the power source powers the blower assembly to direct the stream of air.

2. The riding vehicle of claim 1 wherein the power source is configured to selectively drive the cutting blades disposed on the mower deck.

3. The riding vehicle of claim 1 wherein the power source includes a power takeoff directly coupled to the blower assembly and the clutch.

4. The riding vehicle of claim 3 wherein selective engagement of the clutch enables the power source to selectively drive the cutting blades.

5. The riding vehicle of claim 3 wherein the power takeoff is disposed horizontally with the clutch disposed at an end distal from an end of the power takeoff coupled to the power source.

6. The riding vehicle of claim 1 wherein:
   the blower assembly includes an impeller and a blower housing that houses the impeller;
   the blower housing defines the air inlet and the air outlet;
   the blower housing defines a mower deck air supply outlet separate from the air outlet;
   the mower deck includes a mower deck air inlet in communication with the cutting space; and
   the mower deck air supply outlet of the blower housing is operably coupled to the mower deck air inlet of the mower deck to direct a stream of air from the air inlet of the blower housing to the cutting space of the mower deck.

7. The riding vehicle of claim 6 wherein:
   the air outlet of the blower housing is a right nozzle configured to direct the stream of air toward a right side of the riding vehicle;
   the blower housing includes a left nozzle and a forward facing nozzle each in operable communication with the air inlet;
   the left nozzle is configured to direct a stream of air toward a left side of the riding vehicle; and
   the forward facing nozzle is configured to direct the stream of air toward a front of the riding vehicle.

8. The riding vehicle of claim 7 wherein the blower assembly includes a control assembly for selectively controlling supply of air from the air inlet to the right nozzle, the left nozzle and the forward facing nozzle.

9. The riding vehicle of claim 8 wherein the control assembly includes a plurality of dampers respectively associated with the right nozzle, the left nozzle and the forward facing nozzle, each of the plurality of dampers being user controllable to selectively control supply of air to the right nozzle, the left nozzle and the forward facing nozzle.

10. The riding vehicle of claim 6 wherein air supplied to the cutting space from the blower assembly facilitates evacuation of cuttings from the cutting space to the discharge chute of the mower deck.

11. The riding vehicle of claim 10 wherein the air outlet of the blower assembly is disposed proximal to the discharge chute of the mower deck such that the stream of air output from the air outlet facilitates clearing cuttings that exit the discharge chute away from the riding vehicle.

12. The riding vehicle of claim 6 wherein the plurality of cutting blades includes three cutting blades arranged in a reverse delta configuration with a right blade and a left blade disposed forward of a middle blade, wherein the mower deck is constructed to direct air received by the mower deck air inlet to an area between the left blade and the middle blade, whereby air directed to the area facilitates discharge of cuttings produced by the middle blade.

13. A riding vehicle comprising:
a frame coupled to a riding platform adapted to support a user;
a plurality of wheels coupled to the frame comprising at least two opposing traction wheels;
a mower deck and at least three cutting blades disposed within a cutting space of the mower deck, the mower deck including a discharge chute for expelling cuttings from the mower deck;
a blower assembly supported by the frame and including an air inlet and an air outlet, the blower assembly configured to generate a stream of air from the air inlet to the air outlet, the air outlet being separate from the mower deck;
a power source coupled to the frame, the power source operatively coupled with the at least two opposing traction wheels, the at least three cutting blades, and the blower assembly such that the same power source provides power to the at least two opposing traction wheels, the at least three cutting blades, and the blower assembly, whereby the same power source is configured to power the at least three cutting blades to cut vegetation and power the blower assembly to direct the stream of air separate from the mower deck via the air inlet and the air outlet of the blower assembly; and
wherein the at least three cutting blades include a right cutting blade, a middle cutting blade, and a left cutting blade arranged, with respect to a forward driving direction of the riding vehicle, in a reverse delta configuration such that the right cutting blade and the left cutting blade are disposed forward of the middle cutting blade.

14. The riding vehicle of claim 13 wherein:
the blower assembly includes an impeller and a blower housing that houses the impeller;
the blower housing defines the air inlet and the air outlet; and
the blower housing defines a debris blower air supply outlet corresponding to the air outlet of the blower assembly.

15. The riding vehicle of claim 14 wherein:
the debris blower air supply outlet of the blower housing is a right nozzle configured to direct the stream of air toward a right side of the riding vehicle;
the blower housing includes a left nozzle and a forward facing nozzle each in operable communication with the air inlet;
the left nozzle is configured to direct a stream of air toward a left side of the riding vehicle; and
the forward facing nozzle is configured to direct the stream of air toward a front of the riding vehicle.

16. The riding vehicle of claim 15 wherein the blower assembly includes a control assembly for selectively controlling supply of air from the air inlet to the right nozzle, the left nozzle and the forward facing nozzle.

17. The riding vehicle of claim 16 wherein the control assembly includes a plurality of dampers respectively associated with the right nozzle, the left nozzle and the forward facing nozzle, each of the plurality of dampers being user controllable to selectively control supply of air to the right nozzle, the left nozzle and the forward facing nozzle.

18. The riding vehicle of claim 13 wherein air supplied to the cutting space from the blower assembly facilitates evacuation of cuttings from the cutting space to the discharge chute of the mower deck.

19. The riding vehicle of claim 13 wherein the mower deck includes a mower deck inlet in communication with the cutting space, and wherein the blower assembly includes a mower deck air supply outlet separate from the air outlet of the blower assembly and configured to supply air to the mower deck to direct a stream of air to the cutting space.

20. The riding vehicle of claim 19 wherein the air outlet of the blower assembly is disposed proximal to the discharge chute of the mower deck such that the stream of air output from the mower deck air supply outlet facilitates clearing cuttings that exit the discharge chute away from the riding vehicle.

21. A method of operating a riding vehicle for maintenance of a lawn, the method comprising:
providing a power source with a power takeoff to supply power to at least one of an impeller of a blower assembly, cutting blades of a mower deck, and at least two traction wheels;
driving, with the power takeoff, the impeller of the blower assembly to direct air from an air inlet to an air outlet nozzle;
directing the air output from the air outlet nozzle to a surface area to move debris from one location to another location;
driving, with the power takeoff, the cutting blades of the mower deck to cut areas of the lawn;
discharging cuttings generated by the cutting blades through a discharge chute of the mower deck;
selectively disengaging, via a clutch, the power takeoff from the cutting blades of the mower deck while driving the impeller of the blower assembly with the power takeoff; and
wherein the air inlet and the air outlet nozzle are operable to direct a stream of air separate from the mower deck, and wherein the same power source is configured to power the cutting blades to cut vegetation and power the blower assembly to direct the stream of air separate from the mower deck via the air inlet and the air outlet nozzle.

* * * * *